(12) United States Patent
Nakatani

(10) Patent No.: US 12,031,039 B2
(45) Date of Patent: Jul. 9, 2024

(54) TREAD RUBBER COMPOSITION AND PNEUMATIC TIRE

(71) Applicant: SUMITOMO RUBBER INDUSTRIES, LTD., Hyogo (JP)

(72) Inventor: Masako Nakatani, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 170 days.

(21) Appl. No.: 17/422,862

(22) PCT Filed: Jan. 21, 2020

(86) PCT No.: PCT/JP2020/001964
§ 371 (c)(1),
(2) Date: Jul. 14, 2021

(87) PCT Pub. No.: WO2020/158516
PCT Pub. Date: Aug. 6, 2020

(65) Prior Publication Data
US 2022/0098390 A1 Mar. 31, 2022

(30) Foreign Application Priority Data
Feb. 1, 2019 (JP) ................................ 2019-017109

(51) Int. Cl.
*C08L 9/06* (2006.01)
*B60C 1/00* (2006.01)

(52) U.S. Cl.
CPC .............. *C08L 9/06* (2013.01); *B60C 1/0016* (2013.01); *C08L 2205/025* (2013.01); *C08L 2205/03* (2013.01)

(58) Field of Classification Search
CPC .. C08L 9/06; C08L 2205/025; C08L 2205/03; C08L 15/00; B60C 1/0016; C08F 236/06; C08F 212/08; C08K 3/04; C08K 3/36
See application file for complete search history.

(56) References Cited

U.S. PATENT DOCUMENTS

| | | | |
|---|---|---|---|
| 1,115,514 A * | 11/1914 | Dickenson | B29D 30/08 152/563 |
| 7,064,171 B1 | 6/2006 | Halasa et al. | |
| 2002/0037950 A1 | 3/2002 | Mizuno et al. | |
| 2004/0108034 A1 * | 6/2004 | Weydert | C08L 21/00 152/905 |
| 2005/0211362 A1 * | 9/2005 | Hirayama | B60C 15/06 152/543 |
| 2009/0107597 A1 | 4/2009 | Loewenhaupt et al. | |
| 2010/0036019 A1 | 2/2010 | Miyazaki | |
| 2014/0027029 A1 * | 1/2014 | Kondo | C08K 3/04 152/209.1 |
| 2014/0066548 A1 | 3/2014 | Miyazaki | |
| 2014/0371372 A1 | 12/2014 | Hirayama | |
| 2017/0267027 A1 | 9/2017 | Kunisawa | |
| 2018/0163030 A1 | 6/2018 | Kamada | |
| 2018/0244103 A1 | 8/2018 | Chansorn et al. | |
| 2018/0264884 A1 | 9/2018 | Sato | |
| 2018/0273724 A1 | 9/2018 | Miyazaki | |
| 2019/0309146 A1 | 10/2019 | Yokoyama et al. | |
| 2020/0115532 A1 * | 4/2020 | Amiya | C08L 65/02 |
| 2022/0098390 A1 | 3/2022 | Nakatani | |

FOREIGN PATENT DOCUMENTS

| | | |
|---|---|---|
| CN | 101417587 A | 4/2009 |
| CN | 103665465 A | 3/2014 |
| CN | 107000490 A | 8/2017 |
| CN | 108623856 A | 10/2018 |
| JP | 2010-59398 A | 3/2010 |
| JP | 2010-95670 A | 4/2010 |
| JP | 2013-1795 A | 1/2013 |
| JP | 2014-1357 A | 1/2014 |
| JP | 2014-19756 A | 2/2014 |
| JP | 2017-75227 A | 4/2017 |
| JP | 2018-095702 A | 6/2018 |
| JP | 2018-123260 A | 8/2018 |
| JP | 6417064 B1 | 10/2018 |
| JP | 2020-125378 A | 8/2020 |
| WO | WO 2012/141158 A1 | 10/2012 |
| WO | WO 2013/125614 A1 | 8/2013 |
| WO | WO 2016/137407 * | 9/2016 |
| WO | WO 2018/230048 * | 12/2018 |

OTHER PUBLICATIONS

ISR for PCT/JP2020/001964, dated Mar. 24, 2020.
Written Opinion for PCT/JP2020/001964, dated Mar. 24, 2020.

* cited by examiner

*Primary Examiner* — Doris L Lee
(74) *Attorney, Agent, or Firm* — Greenblum & Bernstein, P.L.C.

(57) ABSTRACT

Provided are tread rubber compositions and pneumatic tires which are excellent in fuel economy, handling stability, and abrasion resistance. Included are tread rubber compositions having a M200 at 25° C., a E* at 30° C., and a tan δ at 30° C. which satisfy the following relationship: M200×E*/tan δ≥400.

12 Claims, No Drawings

TREAD RUBBER COMPOSITION AND PNEUMATIC TIRE

TECHNICAL FIELD

The present invention relates to tread rubber compositions and pneumatic tires.

BACKGROUND ART

Tire treads require properties such as handling stability during running, abrasion resistance, and fuel economy. The properties have been improved, for example, by modifying the rubber components, fillers, or other components used in the treads.

For example, Patent Literature 1 discloses a technique of incorporating a specific modified diene rubber and a specific silica to impart good tire physical properties.

CITATION LIST

Patent Literature

Patent Literature 1: WO 2013/125614

SUMMARY OF INVENTION

Technical Problem

The present invention aims to solve the above problem and provide tread rubber compositions and pneumatic tires which are excellent in fuel economy, handling stability, and abrasion resistance.

Solution to Problem

The present invention relates to tread rubber compositions, having a M200 at 25° C., a E* at 30° C., and a tan δ at 30° C. which satisfy the following relationship:

$$M200 \times E^*/\tan \delta \geq 400.$$

Preferably, the M200, the E*, and the tan δ satisfy the following relationship:

$$M200 \times E^*/\tan \delta \geq 500.$$

Preferably, the rubber compositions contain, per 100 parts by mass of one or more rubber components therein, 75 parts by mass or more of silica.

The present invention also relates to pneumatic tires, having a tread including any of the rubber compositions.

Advantageous Effects of Invention

The tread rubber compositions of the present invention have a M200 at 25° C., a E* at 30° C., and a tan δ at 30° C. which satisfy the relationship: M200×E*/tan δ≥400. Thus, the present invention provides tread rubber compositions and pneumatic tires which are excellent in fuel economy, handling stability, and abrasion resistance.

DESCRIPTION OF EMBODIMENTS

The tread rubber compositions of the present invention have a M200 at 25° C., a E* at 30° C., and a tan δ at 30° C. which satisfy the relationship: M200×E*/tan δ≥400. Thus, it is possible to significantly improve overall performance in terms of fuel economy, handling stability, and abrasion resistance.

The physical properties of (vulcanized) rubber compositions include stress at elongation (modulus), complex modulus, and loss tangent. The present invention is based on the discovery that the rubber compounds provide reduced rolling resistance while ensuring stiffness and durability, particularly when the M200 at 25° C., E* at 30° C., and tan δ at 30° C. satisfy the above-mentioned relationship. Thus, by the use of the rubber compositions satisfying the relationship, it is possible to significantly improve overall performance in terms of fuel economy, handling stability, and abrasion resistance. Accordingly, the present invention solves the problem (purpose) of improving overall performance in terms of fuel economy, handling stability, and abrasion resistance by formulating a tread rubber composition that satisfies the relationship: M200×E*/tan δ≥400. In other words, the parameter of "M200×E*/tan δ≥400" does not define the problem (purpose), and the problem herein is to improve overall performance in terms of fuel economy, handling stability, and abrasion resistance. In order to provide a solution to this problem, an inventive formulation satisfying the parameter has been devised.

The (vulcanized) tread rubber compositions have a M200 at 25° C. (200% modulus (stress at 200% elongation, MPa) measured at a temperature of 25° C.), a E* at 30° C. (complex modulus (MPa) measured at a temperature of 30° C.), and a tan δ at 30° C. (loss tangent measured at a temperature of 30° C.) which satisfy the following relationship:

$$M200 \times E^*/\tan \delta \geq 400.$$

From the standpoint of overall performance in terms of fuel economy, handling stability, and abrasion resistance, the value of "M200×E*/tan δ" is preferably 450 or higher, more preferably 500 or higher, particularly preferably 501 or higher, most preferably 509 or higher. Moreover, the value of "M200×E*/tan δ" is desirably as high as possible. The lower limit may be 510 or higher, 516 or higher, 517 or higher, 525 or higher, 529 or higher, 532 or higher, 533 or higher, 534 or higher, 544 or higher, 548 or higher, 551 or higher, 564 or higher, or 570 or higher. The upper limit is not limited, but it is preferably 800 or lower, more preferably 700 or lower.

From the standpoints of abrasion resistance and handling stability, the (vulcanized) tread rubber compositions preferably have a M200 (MPa) at 25° C. of 8.0 MPa or higher, more preferably 8.3 MPa or higher, still more preferably 8.5 MPa or higher, particularly preferably 8.7 MPa or higher, most preferably 8.8 MPa or higher. Moreover, the M200 is desirably as high as possible. The lower limit may be 9.0 MPa or higher, 9.1 MPa or higher, 9.3 MPa or higher, 9.4 MPa or higher, 9.5 MPa or higher, 9.6 MPa or higher, 9.7 MPa or higher, 9.8 MPa or higher, 10.0 MPa or higher, or 10.3 MPa or higher. The upper limit is not limited, but it is preferably 15.0 MPa or lower, more preferably 12.0 MPa or lower, still more preferably 11.0 MPa or lower.

From the standpoint of handling stability, the (vulcanized) tread rubber compositions preferably have a E* (MPa) at 30° C. of 8.0 MPa or higher, more preferably 8.3 MPa or higher, still more preferably 8.5 MPa or higher, particularly preferably 8.7 MPa or higher, most preferably 8.9 MPa or higher. Moreover, the E* is desirably as high as possible, and may be 9.1 MPa or higher, 9.2 MPa or higher, 9.3 MPa or higher, 9.4 MPa or higher, 9.5 MPa or higher, 9.6 MPa or higher, 9.8 MPa or higher, 9.9 MPa or higher, 10.0 MPa or higher, 10.1 MPa or higher, or 10.4 MPa or higher. The upper limit is not limited, but it is preferably 15.0 MPa or lower, more preferably 12.0 MPa or lower, still more preferably 11.0 MPa or lower.

From the standpoint of fuel economy, the (vulcanized) tread rubber compositions preferably have a tan δ at 30° C. of 0.25 or lower, more preferably 0.22 or lower, still more preferably 0.21 or lower, particularly preferably 0.20 or lower, most preferably 0.19 or lower. Moreover, the tan δ is desirably as low as possible, and may be 0.18 or lower, 0.17 or lower, 0.16 or lower, or 0.15 or lower.

The lower limit is not limited, but it is preferably 0.10 or higher, more preferably 0.12 or higher.

The M200 is measured in accordance with JIS K6251: 2010 as described in EXAMPLES, and the E* and the tan δ are measured as described in EXAMPLES.

The M200, E*, and tan δ can be controlled by the types and amounts of chemicals (in particular, rubber components, fillers) incorporated in the rubber compositions. For example, the M200 tends to be increased by using a high molecular weight rubber component; the E* tends to be increased by using a high molecular weight rubber component or increasing the amount of fillers; and the tan δ tends to be decreased by using a modified rubber or using silica as filler.

Examples of methods for satisfying the relationship: M200×E*/tan δ≥400 include: (a) a method of using a high molecular weight rubber component produced by continuous polymerization; (b) a method of using a modified rubber prepared by introducing a modifying group into a rubber component; (c) a method of controlling the amount of silica; and (d) a method of controlling plasticizers, which methods may be used either individually or in appropriate combination. These methods may be used to satisfy the relationship, thereby improving overall performance in terms of fuel economy, handling stability, and abrasion resistance.

The reason for this advantageous effect is not clear, but is believed to be as follows.

A general method for ensuring fuel economy is to reduce the amount of fillers. This method, however, cannot ensure stiffness and also provides poor abrasion resistance due to the insufficient reinforcement with fillers. Thus, the balance of fuel economy, handling stability, and abrasion resistance is deteriorated. Moreover, modified styrene-butadiene copolymers having superior fuel economy, which are usually produced by batch polymerization, often have a reduced molecular weight due to processability and other problems, while styrene-butadiene copolymers produced by continuous polymerization have a high molecular weight and tend to be superior in stiffness and abrasion resistance but inferior in fuel economy. In contrast, for example, a rubber prepared by introducing a modifying group into a high molecular weight styrene-butadiene copolymer produced by continuous polymerization which is superior in abrasion resistance may be used to satisfy the relationship to significantly improve overall performance in terms of fuel economy, handling stability, and abrasion resistance. This is because abrasion resistance and fuel economy are ensured by the high molecular weight and the modifying group, respectively, and thus the balance between these properties is enhanced. In addition, rubber stiffness (handling stability) is also ensured by the high molecular weight, and thus the balance between fuel economy and handling stability is also enhanced. Therefore, it is believed that the overall performance in terms of the above-mentioned properties can be significantly improved.

The tread rubber compositions usually contain one or more rubber components and one or more fillers.

Examples of the rubber components include diene rubbers such as isoprene-based rubbers, polybutadiene rubbers (BR), styrene-butadiene rubbers (SBR), styrene-isoprene-butadiene rubbers (SIBR), acrylonitrile-butadiene rubbers (NBR), chloroprene rubbers (CR), butyl rubbers (IIR), and styrene-isoprene-butadiene copolymer rubbers (SIBR). Examples of the isoprene-based rubbers include natural rubbers (NR), polyisoprene rubbers (IR), refined NR, modified NR, and modified IR. From the standpoints of fuel economy, handling stability, and abrasion resistance, SBR and/or BR are preferred among these. These rubber components may be used alone or in combinations of two or more.

Oil extended styrene-butadiene copolymers may be suitably used as the SBR.

The oil extended styrene-butadiene copolymers are prepared by extension of styrene-butadiene copolymers with extender oils. When the rubber compositions contain such styrene-butadiene copolymers that are previously extended with extender oils, the dispersion of the extender oils and fillers in the rubber components is enhanced compared to that of rubber compositions prepared by kneading oils during compounding.

The amount (amount of the rubber solids of the styrene-butadiene copolymers) of the oil extended styrene-butadiene copolymers based on 100% by mass of the rubber components is preferably 20% by mass or more, more preferably 30% by mass or more, still more preferably 35% by mass or more, particularly preferably 45% by mass or more, most preferably 55% by mass or more. When the amount is not less than the lower limit, good fuel economy, handling stability, and abrasion resistance tend to be obtained. The upper limit is not limited, but it is preferably 90% by mass or less, more preferably 80% by mass or less, still more preferably 75% by mass or less, particularly preferably 65% by mass or less.

The weight average molecular weight (Mw) of the oil extended styrene-butadiene copolymers is usually 400,000 or more, preferably 600,000 or more, more preferably 770,000 or more, still more preferably 800,000 or more, particularly preferably 850,000 or more, most preferably 870,000 or more. When the Mw is not less than the lower limit, rubber stiffness is also ensured by the high molecular weight, and thus the balance between fuel economy and handling stability tends to be enhanced. The Mw is not limited, but is preferably 1,500,000 or less, more preferably 1,300,000 or less, still more preferably 1,100,000 or less.

The ratio of the weight average molecular weight (Mw) to the number average molecular weight (Mn) (Mw/Mn) of the oil extended styrene-butadiene copolymers is preferably 1.5 or higher, more preferably 1.7 or higher, still more preferably 1.8 or higher, particularly preferably 2.2 or higher, but is preferably 3.0 or lower, more preferably 2.7 or lower, still more preferably 2.5 or lower, particularly preferably 2.3 or lower. When the ratio is within the range indicated above, good fuel economy, handling stability, and abrasion resistance tend to be obtained.

The styrene content of the oil extended styrene-butadiene copolymers is preferably 5% by mass or higher, more preferably 15% by mass or higher, still more preferably 25% by mass or higher, particularly preferably 34% by mass or higher. When the styrene content is not lower than the lower limit, good abrasion resistance tends to be obtained. The styrene content is preferably 45% by mass or lower, more preferably 40% by mass or lower, still more preferably 38% by mass or lower, particularly preferably 35% by mass or lower. When the styrene content is not higher than the upper limit, good fuel economy tends to be obtained.

The vinyl bond content of the oil extended styrene-butadiene copolymers is preferably 20% by mass or higher, more preferably 25% by mass or higher, still more preferably 30% by mass or higher, particularly preferably 39% by mass or higher, most preferably 40% by mass or higher. When the vinyl bond content is not lower than the lower limit, good handling stability tends to be obtained. The vinyl bond content is preferably 80% by mass or lower, more preferably 70% by mass or lower, still more preferably 60% by mass or lower, particularly preferably 50% by mass or lower, most preferably 42% by mass or lower. When the vinyl bond content is not higher than the upper limit, good abrasion resistance tends to be obtained.

Herein, the weight average molecular weight (Mw) and number average molecular weight (Mn) can be determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards. The vinyl bond content (1,2-butadiene unit content) can be determined by infrared absorption spectrometry. The styrene content can be determined by $^1$H-NMR analysis.

Oil extended styrene-butadiene copolymers into which a branched structure is introduced are preferred. Examples of the styrene-butadiene copolymers into which a branched structure is introduced include polymers whose chain end is modified with at least one polyfunctional coupling agent selected from the group consisting of halogen-containing silicon compounds, alkoxysilane compounds, alkoxysilane sulfide compounds, (poly)epoxy compounds, urea compounds, amide compounds, imide compounds, thiocarbonyl compounds, lactam compounds, ester compounds, and ketone compounds; and polymers polymerized in the presence of a small amount of at least one branching agent (e.g., divinylbenzene). Preferred among these are polymers whose chain end is modified with at least one polyfunctional coupling agent, more preferably with at least one selected from halogen-containing silicon compounds, alkoxysilane compounds, alkoxysilane sulfide compounds, and (poly) epoxy compounds, still more preferably with at least one selected from halogen-containing silicon compounds (e.g., silicon tetrachloride), alkoxysilane compounds (e.g., 3-aminopropyltrimethoxysilane, 3-aminopropyltriethoxysilane), and (poly)epoxy compounds.

The styrene-butadiene copolymers may be prepared, for example, by copolymerizing styrene and butadiene using a polymerization initiator. The polymerization initiator is preferably a lithium-based initiator. The lithium-based initiator is preferably an organic lithium compound. Examples of the organic lithium compound include alkyllithiums such as n-butyllithium, sec-butyllithium, and t-butyllithium; alkylenedilithiums such as 1,4-dilithiumbutane; aromatic hydrocarbon lithiums such as phenyllithium, stilbene lithium, diisopropenylbenzene lithium, and reaction products of alkyllithiums (e.g., butyllithium) and divinylbenzene or the like; polynuclear hydrocarbon lithiums such as lithium naphthalene; aminolithium; and tributyltin lithium.

The polymerization may be carried out optionally using an ether compound, amine, or the like as a styrene randomizer during copolymerization or as a vinyl bond content regulator. Examples of the ether compound, amine, or the like include dimethoxybenzene, tetrahydrofuran, dimethoxyethane, diethylene glycol dibutyl ether, diethylene glycol dimethyl ether, triethylamine, pyridine, N-methylmorpholine, N,N,N',N'-tetramethylethylenediamine, and dipiperidinoethane. Moreover, activators such as potassium dodecylbenzenesulfonate, potassium linolenate, potassium benzoate, potassium phthalate, and potassium tetradecylbenzenesulfonate may also be used for the same purpose.

Examples of polymerization solvents that may be used include n-hexane, cyclohexane, heptane, and benzene. The polymerization may be conducted in either a batch or continuous mode, but the continuous mode is preferred in order to suitably obtain a styrene-butadiene copolymer having the above-mentioned properties. The polymerization conditions are as follows: the polymerization temperature is usually 0 to 130° C., preferably 10 to 100° C.; and the polymerization time is usually 5 minutes to 24 hours, preferably 10 minutes to 10 hours. The monomer concentration in the polymerization solvent [total monomer/(total monomer+polymerization solvent)] is usually 5 to 50% by mass, preferably 10 to 35% by mass.

Generally, when a lithium-based initiator is used, the rate of polymerization of styrene is different from that of butadiene. Moreover, the rates of polymerization of these monomers are affected by the polymerization temperature and the monomer concentration. Thus, in the latter half of a simple reaction, where the polymerization temperature is increased, many styrene molecules may be reacted due to the polymerization temperature and the high styrene monomer concentration to form many long styrene chains, resulting in an increased proportion of long styrene chains. Hence, the proportion of single styrene chains and the proportion of long styrene chains may be adjusted to appropriate values, for example, by controlling the polymerization temperature so that styrene and butadiene can react at the same rate, or by starting the reaction with a reduced amount of butadiene charged before the reaction to increase the styrene intake at the initial stage of polymerization, and then continuously introducing the reduced portion of butadiene.

A specific example of a method for introducing a branched structure into a styrene-butadiene copolymer includes, in the case of modification with a polyfunctional coupling agent, reacting the polyfunctional coupling agent with an active polymer having an active lithium terminal produced by batch or continuous polymerization. Alternatively, in the case of polymerization in the presence of a small amount of a branching agent, the introduced amount is preferably 10% by mass or lower based on 100% by mass of the styrene-butadiene copolymer.

Examples of the extender oils used for the extension of the styrene-butadiene copolymers include naphthenic extender oils, paraffinic extender oils, and aromatic extender oils. Aromatic extender oils are preferred among these. Moreover, naphthenic or paraffinic rubber extender oils may also be used in combination. The oil extension may be carried out, for example, by adding an extender oil after completion of the polymerization, followed by solvent removal and drying by conventional methods.

The amount of the extender oils based on 100 parts by mass of the styrene-butadiene copolymers (rubber solids) is preferably 5 to 50 parts by mass, more preferably 10 to 40 parts by mass, still more preferably 12 to 30 parts by mass, particularly preferably 16.9 to 24.4 parts by mass, most preferably 20.7 to 24.4 parts by mass. When the amount is not less than the lower limit, good fuel economy tends to be obtained. When the amount is not more than the upper limit, compounding flexibility tends to be ensured.

In addition to the oil extended styrene-butadiene copolymers, non-oil extended styrene-butadiene copolymers may be used in combination as the SBR.

The amount of the non-oil extended styrene-butadiene copolymers based on 100% by mass of the rubber components is preferably 5% by mass or more, more preferably 15% by mass or more, still more preferably 20% by mass or more, particularly preferably 25% by mass or more. When the amount is not less than the lower limit, good fuel economy, handling stability, and abrasion resistance tend to be obtained. The upper limit is not limited, but it is preferably 50% by mass or less, more preferably 45% by mass or less, still more preferably 40% by mass or less, particularly preferably 35% by mass or less, most preferably 30% by mass or less.

The weight average molecular weight (Mw) of the non-oil extended styrene-butadiene copolymers is preferably 50,000 or more, more preferably 100,000 or more, still more preferably 150,000 or more, particularly preferably 200,000 or more, but is preferably less than 400,000, more preferably 350,000 or less, still more preferably 300,000 or less. When the Mw is within the range indicated above, good fuel economy, handling stability, and abrasion resistance tend to be obtained.

The ratio of the weight average molecular weight (Mw) to the number average molecular weight (Mn) (Mw/Mn) of the non-oil extended styrene-butadiene copolymers is preferably 1.0 or higher, more preferably 1.1 or higher, still more preferably 1.2 or higher, particularly preferably 1.3 or higher, but is preferably 2.0 or lower, more preferably 1.7 or lower, still more preferably 1.5 or lower. When the ratio is within the range indicated above, good fuel economy, handling stability, and abrasion resistance tend to be obtained.

The styrene content of the non-oil extended styrene-butadiene copolymers is preferably 5% by mass or higher, more preferably 15% by mass or higher, still more preferably 20% by mass or higher. When the styrene content is not lower than the lower limit, good abrasion resistance tends to be obtained. The styrene content is preferably 40% by mass or lower, more preferably 35% by mass or lower, still more preferably 30% by mass or lower, particularly preferably 28% by mass or lower. When the styrene content is not higher than the upper limit, good fuel economy tends to be obtained.

The vinyl bond content of the non-oil extended styrene-butadiene copolymers is preferably 40% by mass or higher, more preferably 45% by mass or higher, still more preferably 50% by mass or higher, particularly preferably 60% by mass or higher. When the vinyl bond content is not lower than the lower limit, good handling stability tends to be obtained. The vinyl bond content is preferably 80% by mass or lower, more preferably 75% by mass or lower, still more preferably 65% by mass or lower. When the vinyl bond content is not higher than the upper limit, good abrasion resistance tends to be obtained.

The non-oil extended styrene-butadiene copolymers may be either unmodified or modified SBR, preferably modified SBR.

Any non-oil extended modified styrene-butadiene copolymer (modified SBR (non-oil extended)) having a functional group interactive with a filler such as silica may be used. Examples include a chain end-modified styrene-butadiene copolymer obtained by modifying at least one chain end of a styrene-butadiene copolymer with a compound (modifier) having the functional group (a chain end-modified styrene-butadiene copolymer terminated with the functional group); a backbone-modified styrene-butadiene copolymer having the functional group in the backbone; a backbone- and chain end-modified styrene-butadiene copolymer having the functional group in both the backbone and chain end (e.g., a backbone- and chain end-modified styrene-butadiene copolymer in which the backbone has the functional group, and at least one chain end is modified with the modifier); and a chain end-modified SBR into which a hydroxy or epoxy group has been introduced by modification (coupling) with a polyfunctional compound having two or more epoxy groups in the molecule. These may be used alone or in combinations of two or more.

Examples of the functional group include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitrile, pyridyl, alkoxy, hydroxy, oxy, and epoxy groups. These functional groups may have a substituent. Amino groups (preferably amino groups whose hydrogen atom is replaced with a C1-C6 alkyl group), alkoxy groups (preferably C1-C6 alkoxy groups), alkoxysilyl groups (preferably C1-C6 alkoxysilyl groups), and amido groups are preferred among these.

SBR products manufactured or sold by Sumitomo Chemical Co., Ltd., JSR Corporation, Asahi Kasei Corporation, Zeon Corporation, etc. may be used as the SBR.

Any BR may be used, and examples include high-cis BR and syndiotactic polybutadiene crystal-containing BR. The BR may be either unmodified or modified BR. Examples of the modified BR include those into which the above-mentioned functional groups are introduced. These may be used alone or in combinations of two or more. In particular, BR having a cis content of 90% by mass or higher, preferably 95% by mass or higher, is suitable to enhance abrasion resistance. The cis content can be measured by infrared absorption spectrometry.

The amount of the BR based on 100% by mass of the rubber components is preferably 5% by mass or more, more preferably 10% by mass or more, still more preferably 15% by mass or more. When the amount is not less than the lower limit, good abrasion resistance tends to be obtained. The upper limit is preferably 40% by mass or less, more preferably 30% by mass or less, still more preferably 25% by mass or less, particularly preferably 20% by mass or less.

The BR may be commercially available from Ube Industries, Ltd., JSR Corporation, Asahi Kasei Corporation, Zeon Corporation, etc.

Examples of the fillers include those known in the rubber field, such as silica, carbon black, calcium carbonate, talc, alumina, clay, aluminum hydroxide, aluminum oxide, and mica. Silica or carbon black is preferred among these.

Examples of the silica to be used in the tread rubber compositions include dry silica (anhydrous silica) and wet silica (hydrous silica). Wet silica is preferred among these because it has a large number of silanol groups.

The amount of the silica per 100 parts by mass of the rubber components in the tread rubber compositions is preferably 75 parts by mass or more, more preferably 80 parts by mass or more. When the amount is not less than the lower limit, good fuel economy and abrasion resistance tend to be obtained. The upper limit of the amount is not limited, but it is preferably 150 parts by mass or less, more preferably 130 parts by mass or less, still more preferably 120 parts by mass or less. When the amount is not more than the upper limit, good dispersion tends to be obtained.

The nitrogen adsorption specific surface area ($N_2SA$) of the silica is preferably 80 $m^2/g$ or more, more preferably 120 $m^2/g$ or more, still more preferably 150 $m^2/g$ or more, particularly preferably 175 $m^2/g$ or more. When the $N_2SA$ is not less than the lower limit, good abrasion resistance tends to be obtained. The $N_2SA$ of the silica is also preferably 250 m²/g or less, more preferably 220 m²/g or less, still more preferably 200 m²/g or less. When the N₂SA is not more than the upper limit, good dispersion tends to be obtained.

The N₂SA of the silica is measured by a BET method in accordance with ASTM D3037-93.

The silica may be commercially available from Degussa, Rhodia, Tosoh Silica Corporation, Solvay Japan, Tokuyama Corporation, etc.

The tread rubber compositions preferably contain one or more silane coupling agents together with the silica.

Any silane coupling agent may be used, and examples include sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl) tetrasulfide, bis(2-triethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyltetrasulfide, 2-triethoxysilylethyl-N,N-dimethylthiocarbamoyltetrasulfide, and 3-triethoxysilylpropyl methacrylate monosulfide; mercapto silane coupling agents such as 3-mercaptopropyltrimethoxysilane and 2-mercaptoethyltriethoxysilane; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. Commercial products available from Degussa, Momentive, Shin-Etsu Silicone, Tokyo Chemical Industry Co., Ltd., AZmax. Co., Dow Corning Toray Co., Ltd., etc. may be used. These may be used alone or in combinations of two or more. Sulfide or mercapto silane coupling agents are preferred among these.

Particularly suitable mercapto silane coupling agents include silane coupling agents represented by the formula (S1) below and silane coupling agents containing linking units A and B represented by the formulas (I) and (II), respectively, below. The silane coupling agents containing linking units A and B of formulas (I) and (II) are preferred among these.

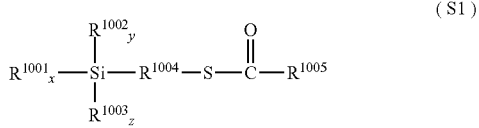

In the formula, $R^{1001}$ represents a monovalent group selected from —Cl, —Br, —OR$^{1006}$, —O(O=)CR$^{1006}$, —ON=CR$^{1006}$R$^{1007}$, —NR$^{1006}$R$^{1007}$, and —(OSiR$^{1006}$R$^{1007}$)$_h$(OSiR$^{1006}$R$^{1007}$R$^{1008}$) wherein R$^{1006}$, R$^{1007}$, and R$^{1008}$ may be the same or different and each represent a hydrogen atom or a C1-C18 monovalent hydrocarbon group, and h is 1 to 4 on average; $R^{1002}$ represents R$^{1001}$, a hydrogen atom, or a C1-C18 monovalent hydrocarbon group; $R^{1003}$ represents the group: —[O(R$^{1009}$O)$_j$]— wherein R$^{1009}$ represents a C1-C18 alkylene group, and j represents an integer of 1 to 4; $R^{1004}$ represents a C1-C18 divalent hydrocarbon group; $R^{1005}$ represents a C1-C18 monovalent hydrocarbon group; and x, y, and z are numbers satisfying the following relationships: x+y+2z=3, 0≤x≤3, 0≤y≤2, and 0≤z≤1.

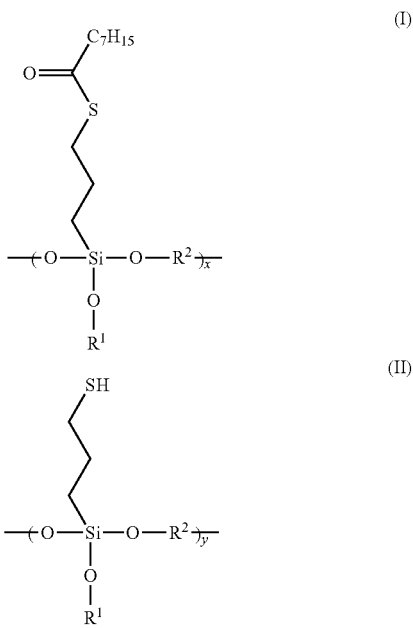

In the formulas, x represents an integer of 0 or more; y represents an integer of 1 or more; $R^1$ represents a hydrogen atom, a halogen atom, a branched or unbranched C1-C30 alkyl group, a branched or unbranched C2-C30 alkenyl group, a branched or unbranched C2-C30 alkynyl group, or the alkyl group in which a terminal hydrogen atom is replaced with a hydroxy or carboxyl group; $R^2$ represents a branched or unbranched C1-C30 alkylene group, a branched or unbranched C2-C30 alkenylene group, or a branched or unbranched C2-C30 alkynylene group; and $R^1$ and $R^2$ may together form a ring structure.

Preferably, $R^{1005}$, $R^{1006}$, $R^{1007}$, and $R^{1008}$ in formula (S1) are each independently selected from the group consisting of C1-C18 linear, cyclic, or branched alkyl, alkenyl, aryl, and aralkyl groups. When $R^{1002}$ is a C1-C18 monovalent hydrocarbon group, it is preferably selected from the group consisting of linear, cyclic, or branched alkyl, alkenyl, aryl, and aralkyl groups. $R^{1009}$ is preferably a linear, cyclic, or branched alkylene group, particularly preferably a linear alkylene group. Examples of $R^{1004}$ include C1-C18 alkylene groups, C2-C18 alkenylene groups, C5-C18 cycloalkylene groups, C6-C18 cycloalkylalkylene groups, C6-C18 arylene groups, and C7-C18 aralkylene groups. The alkylene and alkenylene groups may be either linear or branched. The cycloalkylene, cycloalkylalkylene, arylene, and aralkylene groups may each have a functional group such as a lower alkyl group on the ring. Such $R^{1004}$ is preferably a C1-C6 alkylene group, particularly preferably a linear alkylene group such as a methylene group, an ethylene group, a trimethylene group, a tetramethylene group, a pentamethylene group, or a hexamethylene group.

Specific examples of $R^{1002}$, $R^{1005}$, $R^{1006}$, $R^{1007}$, and $R^{1008}$ in formula (S1) include methyl, ethyl, n-propyl, isopropyl, n-butyl, isobutyl, sec-butyl, tert-butyl, pentyl, hexyl, octyl, decyl, dodecyl, cyclopentyl, cyclohexyl, vinyl, propenyl, allyl, hexenyl, octenyl, cyclopentenyl, cyclohexenyl, phenyl, tolyl, xylyl, naphthyl, benzyl, phenethyl, and naphthylmethyl groups.

As for $R^{1009}$ in formula (S1), examples of the linear alkylene group include methylene, ethylene, n-propylene, n-butylene, and hexylene groups, and examples of the branched alkylene group include isopropylene, isobutylene, and 2-methylpropylene groups.

Specific examples of the silane coupling agents of formula (S1) include 3-hexanoylthiopropyltriethoxysilane, 3-octanoylthiopropyltriethoxysilane, 3-decanoylthiopropyltriethoxysilane, 3-lauroylthiopropyltriethoxysilane, 2-hexanoylthioethyltriethoxysilane, 2-octanoylthioethyltriethoxysilane, 2-decanoylthioethyltriethoxysilane, 2-lauroylthioethyltriethoxysilane, 3-hexanoylthiopropyltrimethoxysilane, 3-octanoylthiopropyltrimethoxysilane, 3-decanoylthiopropyltrimethoxysilane, 3-lauroylthiopropyltrimethoxysilane, 2-hexanoylthioethyltrimethoxysilane, 2-octanoylthioethyltrimethoxysilane, 2-decanoylthioethyltrimethoxysilane, and 2-lauroylthioethyltrimethoxysilane. These may be used alone or in combinations of two or more. Particularly preferred among these is 3-octanoylthiopropyltriethoxysilane.

The linking unit A content of the silane coupling agents containing linking units A and B of formulas (I) and (II) is preferably 30 mol % or higher, more preferably 50 mol % or higher, but is preferably 99 mol % or lower, more preferably 90 mol % or lower, while the linking unit B content is preferably 1 mol % or higher, more preferably 5 mol % or higher, still more preferably 10 mol % or higher, but is preferably 70 mol % or lower, more preferably 65 mol % or lower, still more preferably 55 mol % or lower. Moreover, the combined content of the linking units A and B is preferably 95 mol % or higher, more preferably 98 mol % or higher, particularly preferably 100 mol %.

The linking unit A or B content includes the amount of the linking unit A or B present at the end of the silane coupling agent, if any. When the linking unit A or B is present at the end of the silane coupling agent, its form is not limited as long as it forms a unit corresponding to formula (I) representing the linking unit A or formula (II) representing the linking unit B.

As for $R^1$ in formulas (I) and (II), examples of the halogen atom include chlorine, bromine, and fluorine; examples of the branched or unbranched C1-C30 alkyl group include methyl and ethyl groups; examples of the branched or unbranched C2-C30 alkenyl group include vinyl and 1-propenyl groups; and examples of the branched or unbranched C2-C30 alkynyl group include ethynyl and propynyl groups.

As for $R^2$ in formulas (I) and (II), examples of the branched or unbranched C1-C30 alkylene group include ethylene and propylene groups; examples of the branched or unbranched C2-C30 alkenylene group include vinylene and 1-propenylene groups; and examples of the branched or unbranched C2-C30 alkynylene group include ethynylene and propynylene groups.

In the silane coupling agents containing linking units A and B of formulas (I) and (II), the sum (x+y) of the number of repetitions (x) of the linking unit A and the number of repetitions (y) of the linking unit B is preferably in the range of 3 to 300.

The amount of the silane coupling agents, if present, per 100 parts by mass of the silica is preferably 3 parts by mass or more, more preferably 5 parts by mass or more, but is preferably 20 parts by mass or less, more preferably 15 parts by mass or less.

Any carbon black, including GPF, FEF, HAF, ISAF, and SAF, may be used in the tread rubber compositions. Commercial products available from Asahi Carbon Co., Ltd., Cabot Japan K.K., Tokai Carbon Co., Ltd., Mitsubishi Chemical Corporation, Lion Corporation, NSCC Carbon Co., Ltd., Columbia Carbon, etc. may be used. The incorporation of carbon black provides reinforcement and thus can significantly improve properties such as abrasion resistance.

The amount of the carbon black per 100 parts by mass of the rubber components in the tread rubber compositions is preferably 1 part by mass or more, more preferably 3 parts by mass or more, still more preferably 5 parts by mass or more. When the amount is not less than the lower limit, the effect of the incorporation of carbon black tends to be obtained. The amount of the carbon black is also preferably 15 parts by mass or less, more preferably 10 parts by mass or less, still more preferably 8 parts by mass or less. When the amount is not more than the upper limit, good dispersion tends to be obtained.

The nitrogen adsorption specific surface area ($N_2SA$) of the carbon black in the tread rubber compositions is preferably 80 $m^2/g$ or more, more preferably 100 $m^2/g$ or more, still more preferably 105 $m^2/g$ or more, particularly preferably 114 $m^2/g$ or more. A $N_2SA$ of not less than the lower limit tends to lead to good reinforcement. The upper limit of the $N_2SA$ of the carbon black is not limited, but it is preferably 180 $m^2/g$ or less, more preferably 150 $m^2/g$ or less, still more preferably 130 $m^2/g$ or less.

Herein, the nitrogen adsorption specific surface area of the carbon black is determined in accordance with the method A stipulated in JIS K6217.

The tread rubber compositions preferably contain one or more oils.

Examples of the oils include process oils and plant oils, and mixtures thereof. Examples of the process oils include paraffinic process oils, aromatic process oils, and naphthenic process oils. Examples of the plant oils include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, *camellia* oil, jojoba oil, macadamia nut oil, and tung oil. These may be used alone or in combinations of two or more. Process oils are preferred among these, with aromatic process oils being particularly preferred.

The amount of the oils, if present, per 100 parts by mass of the rubber components is preferably 5 parts by mass or more, more preferably 15 parts by mass or more, still more preferably 20 parts by mass or more, but is preferably 50 parts by mass or less, more preferably 40 parts by mass or less, still more preferably 35 parts by mass or less. The amount of the oils includes the amount of the oils (extender oils) contained in the rubbers (oil extended rubbers), if used.

The tread rubber compositions may contain one or more resins.

Any resin generally used in the tire industry may be used. Examples include rosin resins, coumarone-indene resins, α-methylstyrene resins, terpene resins, p-t-butylphenol acetylene resins, acrylic resins, C5 resins, and C9 resins. Commercial products available from Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JXTG Nippon Oil & Energy Corporation, Arakawa Chemical Industries, Ltd., Taoka Chemical Co., Ltd, Toagosei Co., Ltd., etc. may be used. These may be used alone or in combinations of two or more.

The amount of the resins, if present, per 100 parts by mass of the rubber components is preferably 1 part by mass or more, more preferably 5 parts by mass or more, but is preferably 30 parts by mass or less, more preferably 20 parts by mass or less.

The tread rubber compositions may contain one or more waxes.

Any wax may be used, and examples include petroleum waxes such as paraffin waxes and microcrystalline waxes; naturally-occurring waxes such as plant waxes and animal waxes; and synthetic waxes such as polymers of ethylene, propylene, or other similar monomers. These may be used alone or in combinations of two or more. Petroleum waxes are preferred among these, with paraffin waxes being more preferred.

The waxes may be commercially available from Ouchi Shinko Chemical Industrial Co., Ltd., Nippon Seiro Co., Ltd., Seiko Chemical Co., Ltd., etc.

The amount of the waxes, if present, per 100 parts by mass of the rubber components is preferably 0.3 parts by mass or more, more preferably 0.5 parts by mass or more, but is preferably 20 parts by mass or less, more preferably 10 parts by mass or less.

The tread rubber compositions may contain one or more antioxidants.

Examples of the antioxidants include naphthylamine antioxidants such as phenyl-α-naphthylamine; diphenylamine antioxidants such as octylated diphenylamine and 4,4'-bis(α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis[methylene-3-(3',5'-di-t-butyl-4'-hydroxyphenyl)propionate]methane. These may be used alone or in combinations of two or more. Preferred among these are p-phenylenediamine or quinoline antioxidants.

The antioxidants may be commercially available from Seiko Chemical Co., Ltd., Sumitomo Chemical Co., Ltd., Ouchi Shinko Chemical Industrial Co., Ltd., Flexsys, etc.

The amount of the antioxidants, if present, per 100 parts by mass of the rubber components is preferably 0.5 parts by mass or more, more preferably 1 part by mass or more, but is preferably 10 parts by mass or less, more preferably 5 parts by mass or less.

The tread rubber compositions may contain one or more types of stearic acid.

The stearic acid may be conventional ones, e.g., available from NOF Corporation, Kao Corporation, FUJIFILM Wako Pure Chemical Corporation, or Chiba Fatty Acid Co., Ltd.

The amount of the stearic acid, if present, per 100 parts by mass of the rubber components is preferably 0.5 parts by mass or more, more preferably 1 part by mass or more, but is preferably 10 parts by mass or less, more preferably 5 parts by mass or less.

The tread rubber compositions may contain one or more types of zinc oxide.

The zinc oxide may be conventional ones, e.g., available from Mitsui Mining & Smelting Co., Ltd., Toho Zinc Co., Ltd., HakusuiTech Co., Ltd., Seido Chemical Industry Co., Ltd., or Sakai Chemical Industry Co., Ltd.

The amount of the zinc oxide, if present, per 100 parts by mass of the rubber components is preferably 0.5 parts by mass or more, more preferably 1 part by mass or more, but is preferably 10 parts by mass or less, more preferably 5 parts by mass or less.

The tread rubber compositions preferably contain one or more types of sulfur.

Examples of the sulfur include those commonly used in the rubber industry, such as powdered sulfur, precipitated sulfur, colloidal sulfur, insoluble sulfur, highly dispersible sulfur, and soluble sulfur. These may be used alone or in combinations of two or more.

The sulfur may be commercially available from Tsurumi Chemical Industry Co., Ltd., Karuizawa Sulfur Co., Ltd., Shikoku Chemicals Corporation, Flexsys, Nippon Kanryu Industry Co., Ltd., Hosoi Chemical Industry Co., Ltd., etc.

The amount of the sulfur, if present, per 100 parts by mass of the rubber components is preferably 0.1 parts by mass or more, more preferably 0.5 parts by mass or more, but is preferably 10 parts by mass or less, more preferably 5 parts by mass or less, still more preferably 3 parts by mass or less.

The tread rubber compositions preferably contain one or more vulcanization accelerators.

Examples of the vulcanization accelerators include thiazole vulcanization accelerators such as 2-mercaptobenzothiazole, di-2-benzothiazolyl disulfide, and N-cyclohexyl-2-benzothiazylsulfenamide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazole sulfenamide, N-t-butyl-2-benzothiazolylsulfenamide, N-oxyethylene-2-benzothiazole sulfenamide, and N,N'-di-isopropyl-2-benzothiazole sulfenamide; and guanidine vulcanization accelerators such as diphenylguanidine, diorthotolylguanidine, and orthotolylbiguanidine. These may be used alone or in combinations of two or more. Sulfenamide and/or guanidine vulcanization accelerators are preferred among these.

The amount of the vulcanization accelerators, if present, per 100 parts by mass of the rubber components is preferably 1 part by mass or more, more preferably 2 parts by mass or more, but is preferably 10 parts by mass or less, more preferably 7 parts by mass or less.

In addition to the above-mentioned components, the tread rubber compositions may contain other compounding agents commonly used in the tire industry (e.g., organic crosslinking agents). The amount of each of such compounding agents per 100 parts by mass of the rubber components is preferably 0.1 to 200 parts by mass.

The tread rubber compositions can be prepared, for example, by kneading the components in a rubber kneading machine such as an open roll mill or a Banbury mixer and then vulcanizing the kneaded mixture.

The kneading conditions are as follows. In a base kneading step of kneading additives other than vulcanizing agents and vulcanization accelerators, the kneading temperature is usually 100 to 180° C., preferably 120 to 170° C. In a final kneading step of kneading vulcanizing agents and vulcanization accelerators, the kneading temperature is usually 120° C. or lower, preferably 85 to 110° C. The composition obtained after kneading vulcanizing agents and vulcanization accelerators is usually vulcanized by press vulcanization, for example. The vulcanization temperature is usually 140 to 190° C., preferably 150 to 185° C.

The tread rubber compositions are used in treads of tires. For a tread consisting of a cap tread and a base tread, the tread rubber compositions may be suitably used in the cap tread.

The pneumatic tires of the present invention can be produced from the above-described rubber compositions by usual methods.

Specifically, the above-described rubber compositions, before vulcanization, may each be extruded into the shape of a tire component which is a tread and then assembled with other tire components on a tire building machine in a usual manner to build an unvulcanized tire, which may then be heated and pressurized in a vulcanizer to obtain a tire.

The treads of the pneumatic tires may at least partially or fully include the above-described rubber compositions.

The pneumatic tires may be used as tires for passenger vehicles, large passenger vehicles, large SUVs, heavy duty vehicles such as trucks and buses, light trucks, or motorcycles, racing tires (high performance tires), or tires for other applications. Moreover, the pneumatic tires can be used as all-season tires, summer tires, winter tires (studless winter tires, cold weather tires, snow tires, studded tires), or other types of tires.

EXAMPLES

The present invention will be specifically described with reference to, but not limited to, examples.

Production Example 1

A sufficiently nitrogen-purged autoclave reactor having an internal volume of 20 L equipped with a stirrer and a jacket was charged continuously with styrene at 10.5 g/min, 1,3-butadine containing 100 ppm of 1,2-butadiene at 19.5 g/min, cyclohexane at 150 g/min, tetrahydrofuran at 1.5 g/min, and n-butyllithium at 0.117 mmol/min while controlling the temperature at 70° C. Silicon tetrachloride was continuously fed at 0.14 mmol/min from the top outlet of the first reactor, and the mixture was introduced into a second reactor connected to the first reactor to perform a modification reaction. After completion of the modification reaction, 2,6-di-tert-butyl-p-cresol was added to the polymer solution. Next, 37.5 phr (37.5 parts per 100 parts of the rubber component) of "VIVATEC 500" (trade name, H&R) was added for oil extension, followed by solvent removal by steam stripping and then drying on a hot roll adjusted at 110° C. to obtain an oil extended styrene-butadiene copolymer (SBR 1).

The SBR 1 had a vinyl bond content of 39% by mass, a styrene content of 34% by mass, a Mw of 850,000, and a Mw/Mn ratio of 2.2.

Production Example 2

<Preparation of Terminal Modifier>

A terminal modifier was prepared by charging a sufficiently nitrogen-purged 100 mL graduated flask with 23.6 g of 3-(N,N-dimethylamino)propyltrimethoxysilane, and then adding anhydrous hexane to give a total of 100 mL.

<Preparation of Modified SBR (Non-Oil Extended)>

A sufficiently nitrogen-purged 30 L pressure-proof vessel was charged with 18 L of n-hexane, 540 g of styrene, 1,460 g of butadiene, and 17 mmol of tetramethylethylenediamine, and the mixture was warmed to 40° C. Then, 10.5 mL of butyllithium was added, and the mixture was warmed to 50° C. and stirred for three hours. Next, 3.5 mL of a 0.4 mol/L solution of silicon tetrachloride in hexane was added, and the mixture was stirred for 30 minutes. Subsequently, 30 mL of the terminal modifier was added, and the mixture was stirred for 30 minutes. To the reaction solution was added 2 mL of methanol containing 0.2 g of 2,6-tert-butyl-p-cresol dissolved therein, and the resulting reaction solution was put into a stainless steel container containing 18 L of methanol. Then, agglomerates were collected. The agglomerates were dried under reduced pressure for 24 hours to obtain a modified SBR (SBR 4).

The SBR 4 had a vinyl bond content of 60% by mass, a styrene content of 28% by mass, a Mw of 200,000, and a Mw/Mn ratio of 1.3.

Production Example 3

An oil extended styrene-butadiene copolymer (SBR 5) was prepared as in Production Example 1, except that the reactor was charged with styrene at 11.7 g/min, 1,3-butadine containing 100 ppm of 1,2-butadiene at 18.3 g/min, tetrahydrofuran at 7.0 g/min, and n-butyllithium at 0.189 mmol/min.

The SBR 5 had a vinyl bond content of 40% by mass, a styrene content of 38% by mass, a Mw of 870,000, and a Mw/Mn ratio of 2.3.

Production Example 4

A nitrogen-purged autoclave reactor having an internal volume of 5 L was charged with 175 g of styrene, 260 g of 1,3-butadine containing 150 ppm of 1,2-butadiene, 2,500 g of cyclohexane, 8.75 g of tetrahydrofuran, and 0.068 g of potassium dodecylbenzenesulfonate. The temperature of the contents in the reactor was adjusted to 15° C., and 2.83 mmol of n-butyllithium was then added to initiate polymerization. After five minutes from the initiation of polymerization, 55 g of 1,3-butadiene was continuously fed at a flow rate of 5 g/min. Once the polymerization conversion ratio reached 100%, 3.51 mmol of silicon tetrachloride was added to perform a modification reaction for 15 minutes. After completion of the modification reaction, 2,6-di-tert-butyl-p-cresol was added to the polymer solution. Next, 37.5 phr of "VivaTech 500" (trade name, R&H) was added for oil extension, followed by removing the solvent by steam stripping and then drying the rubber on a hot roll adjusted at 110° C. to obtain an oil extended styrene-butadiene copolymer (SBR 6).

The SBR 6 had a vinyl bond content of 42% by mass, a styrene content of 35% by mass, a Mw of 770,000, and a Mw/Mn ratio of 1.7.

The chemicals used in the examples and comparative examples are listed below.

SBR 1: Production Example 1
SBR 2: Nipol NS522 available from Zeon Corporation (styrene content: 39% by mass, vinyl bond content: 40% by mass, Mw: 650,000, oil content: 37.5 parts by mass per 100 parts by mass of rubber solids)
SBR 3: Tufdene 3830 available from Asahi Kasei Corporation (styrene content: 36% by mass, vinyl bond content: 31% by mass, Mw: 420,000, oil content: 37.5 parts by mass per 100 parts by mass of rubber solids)
SBR 4: Production Example 2
SBR 5: Production Example 3
SBR 6: Production Example 4
BR: BR150B available from Ube Industries, Ltd. (cis content: 98% by mass)
Silica: Ultrasil VN3 (available from Evonik, $N_2SA$: 175 $m^2/g$)

Carbon black: DIABLACK N220 (available from Mitsubishi Chemical Corporation, $N_2SA$: 114 $m^2/g$)
Silane coupling agent 1: Si69 (available from Evonik, bis(3-triethoxysilylpropyl)tetrasulfide)
Silane coupling agent 2: NXT-Z45 available from Momentive (a copolymer of linking units A and B, linking unit A: 55 mol %, linking unit B: 45 mol %)
Oil: Diana Process Oil AH-24 available from Idemitsu Kosan Co., Ltd. (aromatic process oil)
Wax: Ozoace 0355 (available from Nippon Seiro Co., Ltd.)
Antioxidant: NOCRAC 6C available from Ouchi Shinko Chemical Industrial Co., Ltd. (N-(1,3-dimethylbutyl)-N'-phenyl-p-phenylenediamine)
Stearic acid: available from NOF Corporation
Zinc oxide: Zinc oxide #3 (available from HakusuiTech Co., Ltd.)
Sulfur: powdered sulfur (available from Tsurumi Chemical Industry Co., Ltd.)
Vulcanization accelerator 1: NOCCELER NS available from Ouchi Shinko Chemical Industrial Co., Ltd. (N-tert-butyl-2-benzothiazylsulfenamide)
Vulcanization accelerator 2: NOCCELER D available from Ouchi Shinko Chemical Industrial Co., Ltd. (N,N'-diphenylguanidine)

Examples and Comparative Examples

According to each of the formulation recipes shown in the tables, the chemicals other than the sulfur and vulcanization accelerators were kneaded for five minutes at 150° C. using a 1.7 L Banbury mixer (Kobe Steel, Ltd.) to give a kneaded mixture. Next, the sulfur and vulcanization accelerators were added to the kneaded mixture, and they were kneaded for five minutes at 80° C. using an open roll mill to obtain an unvulcanized rubber composition.

The unvulcanized rubber composition was formed into the shape of a cap tread and assembled with other tire components to build an unvulcanized tire. The unvulcanized tire was press-vulcanized at 170° C. for 10 minutes to obtain a test tire (size: 195/65R15).

The test tires prepared as above were evaluated for rubber physical properties and tire performance as described below. The tables show the results. It should be noted that Comparative Examples 1-2 and 2-2 are used as standards of comparison in Tables 1 and 2, respectively.

Tensile Testing

No. 3 dumbbell specimens were prepared from the samples (tread rubber compositions) collected from the cap tread of each test tire, and then subjected to tensile testing at 25° C. in accordance with JIS K6251:2010 to determine the stress at 200% elongation (M200).

(Viscoelastic Testing)

The complex modulus E* (MPa) and loss tangent (tan δ) of the samples (tread rubber compositions) collected from the cap tread of each test tire were measured using a viscoelastic spectrometer VES (available from Iwamoto Seisakusho Co., Ltd.) at a temperature of 30° C., a frequency of 10 Hz, an initial strain of 10%, and a dynamic strain of 2%.

(Fuel Economy)

The rolling resistance of the test tires during running under the conditions including a 15×6JJ rim, an internal pressure of 230 kPa, a load of 3.43 kN, and a speed of 80 km/h was measured with a rolling resistance tester and expressed as an index (rolling resistance index) relative to the standard comparative example (=100). A higher index indicates a smaller rolling resistance and thus better fuel economy.

(Handling Stability)

The test tires were mounted on each wheel of a car (2,000 cc). A test driver drove the car on a test course under general running conditions. The test driver subjectively evaluated the stability of steering control (handling stability). The results are expressed as an index (handling stability index) relative to the standard comparative example (=100). A higher index indicates better handling stability.

(Abrasion Resistance)

The test tires were mounted on a front-engine, front-wheel-drive car made in Japan. After 8,000 km of running, the depth of the grooves on the tread portion was measured. A distance that caused a 1 mm decrease in tire groove depth was calculated and expressed as an index (abrasion resistance index) relative to the standard comparative example (=100). A higher index indicates a longer distance required to cause a 1 mm decrease in tire groove depth, and thus better abrasion resistance.

TABLE 1

| | | Example | | | | | | | |
|---|---|---|---|---|---|---|---|---|---|
| | | 1-1 | 1-2 | 1-3 | 1-4 | 1-5 | 1-6 | 1-7 | 1-8 |
| Amount (parts by mass) | SBR 1 | 55 | 65 | 45 | 55 | | | | |
| | (Extender oil) | (20.7) | (24.4) | (16.9) | (20.7) | | | | |
| | SBR 2 | | | | | | | | |
| | SBR 3 | | | | | | | | |
| | SBR 4 | 30 | 25 | 35 | 30 | 30 | 25 | 35 | 30 |
| | SBR 5 | | | | | 55 | 65 | 45 | 55 |
| | (Extender oil) | | | | | (20.7) | (24.4) | (16.9) | (20.7) |
| | SBR 6 | | | | | | | | |
| | (Extender oil) | | | | | | | | |
| | BR | 15 | 10 | 20 | 15 | 15 | 10 | 20 | 15 |
| | Silica | 80 | 80 | 80 | 80 | 80 | 80 | 80 | 80 |
| | Carbon black | 5 | 5 | 5 | 5 | 5 | 5 | 5 | 5 |
| | Silane coupling agent 1 | 6 | 6 | 6 | | 6 | 6 | 6 | |
| | Silane coupling agent 2 | | | | 6 | | | | 6 |
| | Oil | 5 | 5 | 5 | 5 | 5 | 5 | 5 | 5 |
| | Antioxidant | 2 | 2 | 2 | 2 | 2 | 2 | 2 | 2 |
| | Stearic acid | 2 | 2 | 2 | 2 | 2 | 2 | 2 | 2 |
| | Zinc oxide | 2 | 2 | 2 | 2 | 2 | 2 | 2 | 2 |
| | Wax | 2 | 2 | 2 | 2 | 2 | 2 | 2 | 2 |
| | Sulfur | 1.5 | 1.5 | 1.5 | 1.5 | 1.5 | 1.5 | 1.5 | 1.5 |

TABLE 1-continued

|  |  | | | | | | | | |
|---|---|---|---|---|---|---|---|---|---|
|  | Vulcanization accelerator 1 | 1.5 | 1.5 | 1.5 | 1.5 | 1.5 | 1.5 | 1.5 | 1.5 |
|  | Vulcanization accelerator 2 | 1 | 1 | 1 | 1 | 1 | 1 | 1 | 1 |
| Rubber physical properties | M200 (25° C.) × E* (30° C.)/tanδ (30° C.) | 525 | 533 | 534 | 570 | 548 | 544 | 529 | 564 |
|  | M200 (25° C.) [MPa] | 9.3 | 9.6 | 8.8 | 9.6 | 9.5 | 9.7 | 9.0 | 9.8 |
|  | E* (30° C.) [MPa] | 9.6 | 10.0 | 9.1 | 8.9 | 9.8 | 10.1 | 9.4 | 9.2 |
|  | tan δ (30° C.) | 0.17 | 0.18 | 0.15 | 0.15 | 0.17 | 0.18 | 0.16 | 0.16 |
| Tire performance | Rolling resistance index | 103 | 102 | 105 | 105 | 103 | 102 | 104 | 104 |
|  | Handling stability index | 106 | 107 | 105 | 103 | 107 | 107 | 106 | 104 |
|  | Abrasion resistance index | 122 | 125 | 118 | 125 | 123 | 127 | 120 | 127 |

|  |  |  | Example | | | | Comparative Example | | |
|---|---|---|---|---|---|---|---|---|---|
|  |  |  | 1-9 | 1-10 | 1-11 | 1-12 | 1-1 | 1-2 | 1-3 |
| Amount (parts by mass) | SBR 1 (Extender oil) |  |  |  |  |  |  |  | 55 (20.7) |
|  | SBR 2 |  |  |  |  |  | 55 |  |  |
|  | SBR 3 |  |  |  |  |  |  | 55 |  |
|  | SBR 4 |  | 30 | 25 | 35 | 30 | 30 | 30 | 30 |
|  | SBR 5 (Extender oil) |  |  |  |  |  |  |  |  |
|  | SBR 6 (Extender oil) |  | 55 (20.7) | 65 (24.4) | 45 (16.9) | 55 (20.7) |  |  |  |
|  | BR |  | 15 | 10 | 20 | 15 | 15 | 15 | 15 |
|  | Silica |  | 80 | 80 | 80 | 80 | 80 | 80 | 70 |
|  | Carbon black |  | 5 | 5 | 5 | 5 | 5 | 5 | 5 |
|  | Silane coupling agent 1 |  | 6 | 6 | 6 |  | 6 | 6 | 6 |
|  | Silane coupling agent 2 |  |  |  |  | 6 |  |  |  |
|  | Oil |  | 5 | 5 | 5 | 5 | 5 | 5 | 5 |
|  | Antioxidant |  | 2 | 2 | 2 | 2 | 2 | 2 | 2 |
|  | Stearic acid |  | 2 | 2 | 2 | 2 | 2 | 2 | 2 |
|  | Zinc oxide |  | 2 | 2 | 2 | 2 | 2 | 2 | 2 |
|  | Wax |  | 2 | 2 | 2 | 2 | 2 | 2 | 2 |
|  | Sulfur |  | 1.5 | 1.5 | 1.5 | 1.5 | 1.5 | 1.5 | 1.5 |
|  | Vulcanization accelerator 1 |  | 1.5 | 1.5 | 1.5 | 1.5 | 1.5 | 1.5 | 1.5 |
|  | Vulcanization accelerator 2 |  | 1 | 1 | 1 | 1 | 1 | 1 | 1 |
| Rubber physical properties | M200 (25° C.) × E* (30° C.)/tanδ (30° C.) |  | 509 | 517 | 516 | 551 | 378 | 339 | 315 |
|  | M200 (25° C.) [MPa] |  | 9.1 | 9.4 | 8.7 | 9.5 | 7.7 | 6.5 | 6.3 |
|  | E* (30° C.) [MPa] |  | 9.5 | 9.9 | 8.9 | 8.7 | 10.3 | 9.9 | 7.5 |
|  | tan δ (30° C.) |  | 0.17 | 0.18 | 0.15 | 0.15 | 0.21 | 0.19 | 0.15 |
| Tire performance | Rolling resistance index |  | 103 | 102 | 105 | 105 | 98 | 100 | 105 |
|  | Handling stability index |  | 105 | 105 | 104 | 102 | 102 | 100 | 95 |
|  | Abrasion resistance index |  | 121 | 123 | 117 | 123 | 115 | 100 | 95 |

TABLE 2

|  |  | Example | | | | Comparative Example | |
|---|---|---|---|---|---|---|---|
|  |  | 2-1 | 2-2 | 2-3 | 2-4 | 2-1 | 2-2 |
| Amount (parts by mass) | SBR 1 (Extender oil) | 55 (20.7) | 65 (24.4) | 45 (16.9) | 55 (20.7) |  |  |
|  | SBR 2 |  |  |  |  | 55 |  |
|  | SBR 3 |  |  |  |  |  | 55 |
|  | SBR 4 | 30 | 25 | 35 | 30 | 30 | 30 |
|  | SBR 5 (Extender oil) |  |  |  |  |  |  |
|  | SBR 6 (Extender oil) |  |  |  |  |  |  |
|  | BR | 15 | 10 | 20 | 15 | 15 | 15 |
|  | Silica | 90 | 90 | 90 | 90 | 90 | 90 |
|  | Carbon black | 5 | 5 | 5 | 5 | 5 | 5 |
|  | Silane coupling agent 1 | 6 | 6 | 6 |  | 6 | 6 |
|  | Silane coupling agent 2 |  |  |  | 6 |  |  |
|  | Oil | 5 | 5 | 5 | 5 | 5 | 5 |
|  | Antioxidant | 2 | 2 | 2 | 2 | 2 | 2 |
|  | Stearic acid | 2 | 2 | 2 | 2 | 2 | 2 |
|  | Zinc oxide | 2 | 2 | 2 | 2 | 2 | 2 |
|  | Wax | 2 | 2 | 2 | 2 | 2 | 2 |
|  | Sulfur | 1.5 | 1.5 | 1.5 | 1.5 | 1.5 | 1.5 |
|  | Vulcanization accelerator 1 | 1.5 | 1.5 | 1.5 | 1.5 | 1.5 | 1.5 |
|  | Vulcanization accelerator 2 | 1 | 1 | 1 | 1 | 1 | 1 |
| Rubber physical properties | M200 (25° C.) × E* (30° C.)/tanδ (30° C.) | 500 | 510 | 501 | 532 | 306 | 248 |
|  | M200 (25° C.) [MPa] | 10.0 | 10.3 | 9.5 | 10.3 | 7.2 | 7.0 |
|  | E* (30° C.) [MPa] | 10.0 | 10.4 | 9.5 | 9.3 | 10.2 | 7.8 |
|  | tanδ (30° C.) | 0.20 | 0.21 | 0.18 | 0.18 | 0.24 | 0.22 |

TABLE 2-continued

| | | Example | | | | Comparative Example | |
|---|---|---|---|---|---|---|---|
| | | 2-1 | 2-2 | 2-3 | 2-4 | 2-1 | 2-2 |
| Tire performance | Rolling resistance index | 103 | 102 | 105 | 105 | 97 | 100 |
| | Handling stability index | 107 | 108 | 105 | 104 | 107 | 100 |
| | Abrasion resistance index | 123 | 125 | 119 | 124 | 115 | 100 |

Tables 1 and 2 show that excellent overall performance in terms of fuel economy, handling stability, and abrasion resistance was exhibited by the tires of the examples including a tread having a M200 (25° C.), a E* (30° C.), and a tan δ (30° C.) which satisfied the relationship: M200×E*/tan δ≥400. Thus, these examples were significantly excellent in overall performance in terms of fuel economy, handling stability, and abrasion resistance (expressed by the sum of the three indices of rolling resistance, handling stability, and abrasion resistance).

The invention claimed is:

1. A tread rubber composition, having a stress at 200% elongation (M200 in MPa) at 25° C., a complex modulus (E* in MPa) at 30° C., and a loss tangent (tan δ) at 30° C. which satisfy the following relationships:

$M200 \times E^*/\tan \delta \geq 400$; and $E^* \geq 9.1$ MPa;

wherein the rubber composition comprises, per 100 parts by mass of one or more rubber components therein, 75 parts by mass or more of silica and 1 to 15 parts by mass of carbon black.

2. The tread rubber composition according to claim 1, wherein the M200, the E*, and the tan δ satisfy the following relationship:

$M200 \times E^*/\tan \delta \geq 500$.

3. The tread rubber composition according to claim 1, which further satisfies the following relationship:

$M200 \geq 8.5$ MPa.

4. The tread rubber composition according to claim 1, wherein:
an amount of polybutadiene rubber contained in the tread rubber composition is 10 to 20%, and
an amount of styrene-butadiene rubber is 80 to 90%, based on 100% by mass of a rubber component.

5. A pneumatic tire, comprising a tread comprising the rubber composition according to claim 1.

6. A pneumatic tire, comprising a tread comprising the rubber composition according to claim 2.

7. A pneumatic tire, comprising a tread comprising the rubber composition according to claim 3.

8. A pneumatic tire, comprising a tread comprising the rubber composition according to claim 4.

9. A tread rubber composition, having a stress at 200% elongation (M200 in MPa) at 25° C., a complex modulus (E* in MPa) at 30° C., and a loss tangent (tan δ) at 30° C., which satisfy the following relationships:

$E^* \geq 9.1$ MPa;

$M200 \times E^*/\tan \delta \geq 400$; and $M200 \geq 8.5$ MPa, wherein:
an amount of polybutadiene rubber contained in the tread rubber composition is 10 to 20%, and
an amount of styrene-butadiene rubber is 80 to 90%, based on 100% by mass of a rubber component.

10. The tread rubber composition according to claim 9, wherein the rubber composition comprises, per 100 parts by mass of one or more rubber components therein, 75 parts by mass or more of silica and 1 to 15 parts by mass of carbon black.

11. A pneumatic tire, comprising a tread comprising the rubber composition according to claim 9.

12. A pneumatic tire, comprising a tread comprising the rubber composition according to claim 10.

* * * * *